Figure 3:
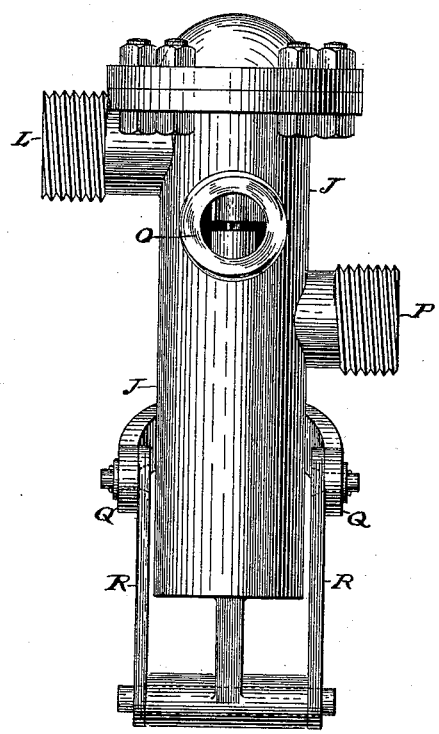
Figure 4:
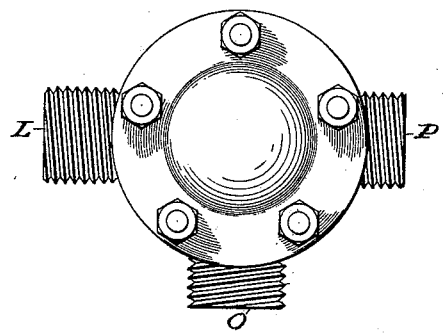

(No Model.) 2 Sheets—Sheet 1.
J. HOWARD.
VALVE FOR CONTROLLING PRESSURE.
No. 431,660. Patented July 8, 1890.
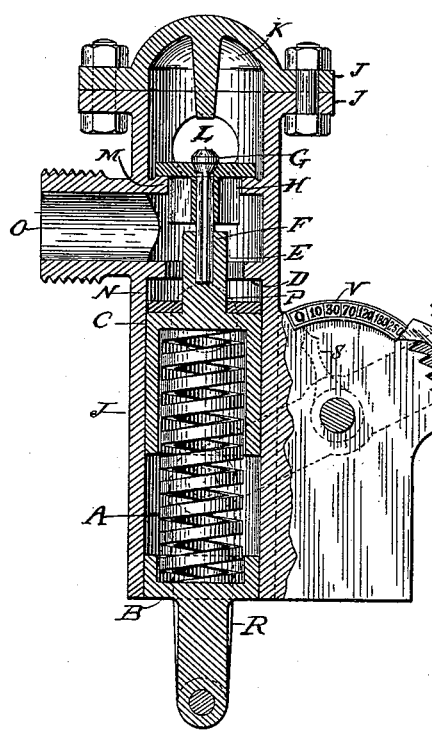
Fig. 1.
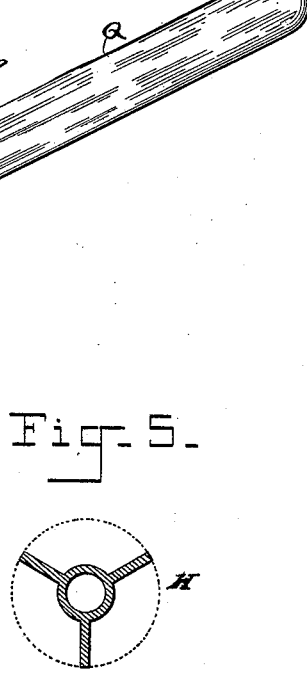
Fig. 3.
Fig. 2.
Fig. 4.
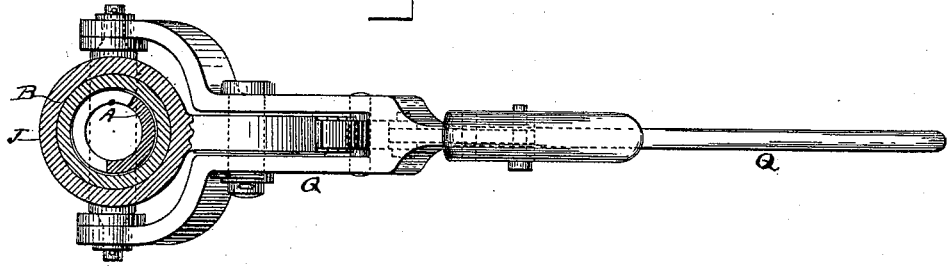
Witnesses.
John F. Nelson.
Chas. C. Gill
Inventor.
James Howard (No Model.) 2 Sheets—Sheet 2.

J. HOWARD.
VALVE FOR CONTROLLING PRESSURE.

No. 431,660. Patented July 8, 1890.

Witnesses.
John F. Nelson
Chas. C. Gill.

Inventor.
James Howard

UNITED STATES PATENT OFFICE.

JAMES HOWARD, OF NEW YORK, N. Y.

VALVE FOR CONTROLLING PRESSURE.

SPECIFICATION forming part of Letters Patent No. 431,660, dated July 8, 1890.

Application filed September 26, 1889. Serial No. 325,194. (No model.)

*To all whom it may concern:*

Be it known that I, JAMES HOWARD, a subject of Her Majesty the Queen of Great Britain, residing in the city of New York, in the county and State of New York, have invented certain new and useful Improvements in Valves for Controlling Pressure, of which the following is a specification.

My invention relates to the control of pressure by means of a combination of valves, and is called an "engineer's valve."

The object of my engineer's valve is not only to regulate the pressure of any reservoir of force, but at the same time to enable any amount of such pressure or force to be used at the will of the operator, and thus the valve is not only a pressure-regulator, but is at the same time an operating or starting valve, and in this feature lies its chief novelty.

There are many pressure-regulating valves, but none of them are at the same time operating or starting valves. The utility of this latter feature may be illustrated by considering the action of this valve on a locomotive-boiler when used in connection with a brake-cylinder of a steam-brake upon the same locomotive. These locomotive-brakes have to be constructed to brake a certain amount of the load upon the wheels. Brake authorities place this as high as eighty per cent. of the weight upon the wheels. The boiler-pressure is a fixed amount, and the brake-cylinder is made of such dimensions as will give eighty per cent. (wheel weight) pressure upon the brake-shoes.

Captain Galton proved by his brake experiments, which were published in *Engineering*, June and October, 1878, and in May, 1879, that double the amount of this pressure could be safely used at high velocities, when the most effective braking could be done; but so far as I am aware there has up to the present time existed no such valve appliance that would enable the operator to take advantage of this important fact and give him quick and certain control of the pressure at will, enabling him to prevent the damage that would otherwise arise from the sliding of the wheels, which would take place before the stop was complete.

With all ordinary operating or starting valves the full pressure is either "on" or "off." There is no graduation of the pressure or instantaneous modification possible at the will of the operator; but by the use of this engineer's valve the pressure is under complete control from zero up to the full pressure of the boiler, and can be so given in the brake-cylinder by the simple motion of the hand-lever that operates the valve. Thus an engineer is enabled to take advantage of Captain Galton's discovery and in cases of emergency apply the full force of his boiler-pressure at high speeds and instantly check any tendency to slide the wheels by decreasing the pressure gradually to a full stop. The additional elements of safety thus placed in his hands by use of this valve is one of its most important features, but is not the only utility of the valve.

Many railroads are now using both steam and air as a motive power for brake purposes, and it is desirable to be able to change from one motive power to the other without disturbing the brake-fixtures. The engineer's valve will do this. Suppose a locomotive fitted with an air-brake whose cylinder and brake gearing are calculated for eighty pounds pressure and it is desirable to change from air to steam. The difficulty in making this change lies in the boiler-pressure being so much greater than the air-pressure, being probably one hundred and sixty pounds, while the air is only eighty pounds. The application of the valve enables steam to be used at eighty pounds, although there is one hundred and sixty pounds in the boiler, and thus the brake-gearing needs no alteration, and at the same time the full pressure of the boiler is available at high speed for emergency stops. No other pressure-regulating valve that I am aware of possesses this important feature. It is also evident that from a bank of boilers, by the use of this valve, any pressure within their limit may be taken from any one of them, if so desired.

Having mentioned these instances of the utility of this invention, I will now describe the engineer's valve and its action.

Figure 1 is a vertical section of the valve. Fig. 2 is a plan view of the valve-handle and its attachment to the valve-casing, the latter being shown in section. Fig. 3 is an elevation of the valve. Fig. 4 is a plan view of the top of the valve. Fig. 5 is a sectional view of the main valve, and Fig. 6 is a sectional view of the pin-valve.

In Fig. 1 is shown the three valves. H is the main or operating valve. G is the pin-valve, passing through and having its seat in the main or operating valve H. The normal condition of these two valves is closed. C is the pressure-regulating valve. Its normal condition is open. This valve is made in the form of a cap and covers the top of spring A, having its seat at D. It also has a projection E, which contains recess F. This recess receives the lower end of pin-valve G for the purpose of operating pin-valve G. This same projection E also operates the main-valve H. The outside casing J contains the main steam or air chamber K with its inlet L and valve-seats M and N. The outlet of the motor-cylinder is at O, and the exhaust-outlet is shown in dotted lines at P. The spring A is operated by the cup B, being moved by lever-handle Q and pitman R. The handle carries an index-finger S, pointing on scale V, and a pawl T, fitting into teeth U.

To operate the valve, suppose it connected at L to a steam-boiler having a pressure of one hundred and eighty pounds per square inch and only one hundred and twenty pounds of this is required on the motor-cylinder connected at O. The spring has been graduated to the index, and the handle is pulled so that the index-finger moves toward 120 pounds on this index. The spring A rises, and in so doing it first lifts the pressure-regulating valve C, which at the same time lifts the pin-valve G. This pin-valve G serves to equalize the pressure on the main or operating valve H, which in its turn is lifted, and at the same time the pressure-regulating valve C is closed on its seat N, and compression of the spring A begins and increases by the motion of the handle Q being continued till it reaches the 120 pounds notch, when it is held by the pawl. As soon as the pressure rises in the motor-cylinder beyond one hundred and twenty pounds the pressure regulating valve C is forced off its seat, and the exhaust-port P is opened until the presssure is reduced to one hundred and twenty pounds, when the resilience of the spring asserts itself and the valve is again closed. Thus the pressure is retained in the motor-cylinder at one hundred and twenty pounds, notwithstanding there may be one hundred and eighty pounds in the boiler, and it is manifest that any pressure up to the boiler limit may be given instantly and varied at the will of the operator, and that the valve not only acts as a pressure-regulating valve, but as a starting and operating valve also.

It is not necessary to adhere to the lever style of handle shown, as there are several well-known methods of compressing a spring by cam, or screw, or Chinese windlass, any one of which may be used, as found convenient. The pin-valve G is also unnecessary when low pressures only are dealt with, as this valve is introduced solely for the purpose of making it easy to open the main valve H. By causing the valve G to open first the pressure upon main valve H is relieved, and there is little or no resistance to the valve-handle, so that all the force applied to the handle is utilized in the compression of the spring; but when low pressure only is used this provision is unnecessary.

What I claim as my invention, and desire to secure by Letters Patent, is—

1. In devices for the control of pressure from any reservoir of force, an engineer's valve containing in a casing three valves, consisting of a main valve with a pin-valve working through it, and a relief-valve having a stem which operates the pin-valve, substantially as set forth.

2. In devices for the control of pressure from any reservoir of force, an engineer's valve containing in a casing three valves, consisting of a main valve with a pin-valve working through it, and a relief-valve with a spring seated upon it and controlled by a lever or other suitable means for increasing or decreasing the amount of pressure of the spring upon the relief-valve, substantially as set forth.

3. The engineer's valve for the control of pressure, consisting of the two valves H and C, as described, with their casing, inlet, outlet, and relief port, and a spring operated by suitable means for regulating and operating the force supplied, substantially as set forth.

4. The engineer's valve, as specified and shown, having, in combination, the casing J, with chamber K, inlet L, and valve-seats M and N, outlet O, exhaust-port P, main valve H, pin-valve G, pressure-regulating valve C, with projection E and recess F, spring A, resting in cup B, operated by handle Q and pitman R, index-finger S, scale V, pawl T, and teeth U, substantially as set forth.

Signed at New York, in the county of New York and State of New York, this 9th day of September, A. D. 1889.

JAMES HOWARD.

Witnesses:
CHAS. C. GILL,
R. A. PORTEOUS.